US010259584B2

(12) United States Patent
Oleson et al.

(10) Patent No.: US 10,259,584 B2
(45) Date of Patent: Apr. 16, 2019

(54) AIRCRAFT SEAT WITH OCCUPANT WEIGHT SENSING MECHANISM TO ADJUST TILT-RECLINE FORCE

(71) Applicant: B/E AEROSPACE, INC., Wellington, FL (US)

(72) Inventors: Michael L. Oleson, Parkland, FL (US); Arjun Koustubhan, Hyderabad (IN); Anatoly Starikov, Hollandale Beach, FL (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 207 days.

(21) Appl. No.: 15/337,912

(22) Filed: Oct. 28, 2016

(65) Prior Publication Data

US 2017/0043876 A1 Feb. 16, 2017

Related U.S. Application Data

(63) Continuation-in-part of application No. 14/695,179, filed on Apr. 24, 2015, now Pat. No. 9,738,388.
(Continued)

(51) Int. Cl.
*A47C 7/34* (2006.01)
*B64D 11/06* (2006.01)
(Continued)

(52) U.S. Cl.
CPC ........ *B64D 11/064* (2014.12); *A47C 1/03283* (2013.01); *A47C 7/345* (2013.01);
(Continued)

(58) Field of Classification Search
CPC ............................. A47C 7/345; A47C 1/03283
See application file for complete search history.

(56) References Cited

U.S. PATENT DOCUMENTS 4,758,045 A * 7/1988 Edel .................. A47C 1/03255
297/300.2
4,962,962 A * 10/1990 Machate ............ A47C 1/03255
297/300.5
(Continued)

FOREIGN PATENT DOCUMENTS

GB 2 166 948 A 5/1986
WO WO 2005/102112 A2 3/2005

OTHER PUBLICATIONS

International Search Report and Written Opinion of corresponding International Application No. PCT/US2015/027435; dated Oct. 13, 2015; 15 pages.

*Primary Examiner* — Timothy J Brindley
(74) *Attorney, Agent, or Firm* — Clements Bernard Walker PLLC

(57) ABSTRACT

In a preferred embodiment, a tilt-recline force adjusting apparatus for an aircraft passenger seat configured for a tilt-recline positioning includes a first spring having a first axis to urge a seat back into an upright position, the first spring arranged to compress as the seat is manually reclined, a helper spring having a second axis parallel to the first axis, the helper spring arranged to assist or counteract the first spring, an adjustment mechanism coupled to the helper spring to increase or decrease a force exerted by the helper spring to assist or counteract the first spring, and a weight sensing mechanism coupled to the adjustment mechanism and operable to actuate the adjustment mechanism in direct proportion to a weight of a seated passenger, whereby the force exerted on the aircraft seat to urge the seat back into an upright position is greater for a heavier seated passenger.

11 Claims, 14 Drawing Sheets

Related U.S. Application Data

(60) Provisional application No. 61/983,781, filed on Apr. 24, 2014.

(51) Int. Cl.
| | | |
|---|---|---|
| *A47C 1/032* | (2006.01) | |
| *B60N 2/00* | (2006.01) | |
| *B60N 2/90* | (2018.01) | |
| *B60N 2/18* | (2006.01) | |
| *B60N 2/02* | (2006.01) | |

(52) U.S. Cl.
CPC ........... *B60N 2/002* (2013.01); *B60N 2/1821* (2013.01); *B60N 2/1835* (2013.01); *B60N 2/1885* (2013.01); *B60N 2/919* (2018.02); *B60N 2002/0268* (2013.01); *B60N 2002/924* (2018.02); *Y02T 50/46* (2013.01)

(56) References Cited

U.S. PATENT DOCUMENTS

| | | | | | |
|---|---|---|---|---|---|
| 5,316,370 | A * | 5/1994 | Newman | ............ | A61G 5/14 297/313 |
| 6,227,489 | B1 * | 5/2001 | Kitamoto | ............ | B64D 11/00 244/118.5 |
| 6,449,783 | B1 * | 9/2002 | Moser | ............ | A47K 13/10 4/254 |
| 2001/0000639 | A1 * | 5/2001 | Park | ............ | A47C 1/0352 297/411.3 |
| 2004/0066067 | A1 * | 4/2004 | Wagner | ............ | B60N 2/0228 297/216.15 |
| 2004/0227385 | A1 * | 11/2004 | Piretti | ............ | A47C 1/03255 297/313 |
| 2009/0261637 | A1 * | 10/2009 | Schmitz | ............ | A47C 1/03255 297/217.2 |
| 2010/0187881 | A1 * | 7/2010 | Fujita | ............ | B60N 2/028 297/284.3 |
| 2012/0139302 | A1 * | 6/2012 | Estevenin | ............ | B64D 11/06 297/162 |
| 2013/0082502 | A1 * | 4/2013 | Ward | ............ | B60N 2/433 297/378.11 |
| 2013/0113250 | A1 * | 5/2013 | Udriste | ............ | B64D 11/06 297/217.3 |
| 2013/0169017 | A1 * | 7/2013 | Masunaga | ............ | A47C 1/03255 297/320 |
| 2014/0001802 | A1 * | 1/2014 | Piaulet | ............ | B60N 2/002 297/217.2 |
| 2014/0084655 | A1 * | 3/2014 | Thompson | ............ | B60N 2/067 297/344.1 |
| 2014/0300161 | A1 * | 10/2014 | Beroth | ............ | B64D 11/06 297/340 |
| 2015/0108804 | A1 * | 4/2015 | Meister | ............ | B64D 11/06 297/313 |
| 2015/0203205 | A1 * | 7/2015 | Thompson | ............ | B64D 11/064 297/344.1 |
| 2015/0284087 | A1 * | 10/2015 | Henshaw | ............ | B64D 11/064 297/318 |
| 2016/0229539 | A1 * | 8/2016 | Ferguson | ............ | B64D 11/0639 |
| 2016/0311537 | A1 * | 10/2016 | Marini | ............ | B60N 2/995 |
| 2016/0325642 | A1 * | 11/2016 | Fitzpatrick | ............ | B60N 2/045 |

* cited by examiner

US 10,259,584 B2

AIRCRAFT SEAT WITH OCCUPANT WEIGHT SENSING MECHANISM TO ADJUST TILT-RECLINE FORCE

CROSS REFERENCES TO RELATED APPLICATIONS

This application is a continuation-in-part of U.S. application Ser. No. 14/695,179, entitled "Aircraft Seat with Occupant Weight Sensing Mechanism to Adjust Tilt-Recline Force" and filed Apr. 24, 2015, which claims priority from U.S. Provisional Application No. 61/983,781, filed Apr. 24, 2014, the contents of both which are incorporated by reference in their entirety.

BACKGROUND

The present disclosure relates to the field of aircraft seats, and more particularly, to an aircraft seat incorporating an occupant weight sensing mechanism configured to automatically adjust the tilt-recline force (return force) of the seat in proportion to the body weight of the seat occupant.

Aircraft seats are typically configured to recline from an upright takeoff sitting position to enhance passenger comfort during flight. Most aircraft seat recline mechanisms incorporate mechanical actuators for adjusting the position and angle of the seat pan and seatback relative to a fixed base frame. The seatback is typically pivotably connected to the seat pan such that movement of the seat pan drives movement of the seatback along a predetermined path, thereby maintaining a predetermined angular relationship between the seat pan and the seatback as the seat reclines.

There are currently no known aircraft seats that incorporate any form of weight sensing mechanism to adjust the tilt-recline return force to help return the seat to the upright sitting position. Further, there are no known seat recline mechanisms that utilize the "free energy" from the weight of the seat occupant to help drive the system. Accordingly, embodiments of a weight sensing mechanism for an aircraft seat and an aircraft seat including a weight sensing mechanism are provided herein.

SUMMARY OF ILLUSTRATIVE EMBODIMENTS

A tilt-recline force adjusting mechanism for an aircraft seat is disclosed.

In one aspect, the present disclosure relates to a tilt-recline force adjusting mechanism including a gas spring assembly arranged between a fixed seat frame member and a movable seat pan member, the gas spring assembly arranged to compress as the seat reclines. The tilt-recline force adjusting mechanism may include a helper spring positioned coaxial with at least a portion of the gas spring assembly, the helper spring arranged to compress as the seat reclines. The tilt-recline force adjusting mechanism may include a weight sensing mechanism configured to sense a weight of a seated passenger and adjust an amount of helper spring deflection in direct proportion to the weight of the seated passenger.

In another aspect, a tilt-recline force adjusting mechanism may have a weight sensing mechanism that includes a plate adapted to attach to an underside of seat pan springs, a lever attached to the plate, and a cable attached at one end to the lever and at an opposite end to a bracket that slides along a rail thereby pulling an attached chain along therewith, wherein lateral projections on certain ones of chain links of the chain extend through openings in a cylinder of the gas spring assembly to limit compression of the helper spring.

In yet another aspect, a tilt-recline force adjusting mechanism may have a weight sensing mechanism that includes a weight sensing mat positioned in or under a seat cushion such that it may sense the weight of the seated passenger, circuitry electrically connected to the weight sensing mat, an actuator electrically connected to the circuitry, a linkage pivotably connected to the actuator, wherein the weight sensing mat, the circuitry, the actuator, and the linkage are coordinated to adjust the travel of the gas spring assembly in proportional response to the weight of the seated passenger.

In yet another aspect, a tilt-recline force adjusting mechanism may have a weight sensing mechanism that includes a weight sensing mat positioned in or under a seat cushion such that it may sense the weight of the seated passenger, circuitry electrically connected to the weight sensing mat, an actuator electrically connected to the circuitry, a gear mounted to a shaft of the actuator, wherein the weight sensing mat, the circuitry, the actuator, and the gear are coordinated to rotate an outer cylinder of the gas spring assembly to compress the helper spring in proportional response to the weight of the seated passenger.

In yet another aspect, a tilt-recline force adjusting mechanism may have a weight sensing mechanism that includes a weight sensing mat positioned in or under a seat cushion such that it may sense the weight of the seated passenger, circuitry electrically connected to the weight sensing mat, an actuator electrically connected to the circuitry, a leadscrew scissors mechanism mounted to a shaft of the actuator, wherein the weight sensing mat, the circuitry, the actuator, and the lead screw scissors mechanism are coordinated to compress the helper spring in proportional response to the weight of the seated passenger.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

Like reference numbers refer to like elements throughout the various drawings.

Referring to the figures, embodiments of aircraft passenger seat pan configurations and weight sensing mechanisms for assisting in returning a tilted/reclined seat pan to an upright sitting position are shown. The weight sensing mechanisms described herein generally assist by providing a return force proportional to the seat occupant's body weight, also referred to herein as the "passenger body weight" or "load" on the seat pan, thus utilizing "free energy" from the occupant's body weight to assist in driving the system. The adjustment of the tilt/recline force may be automatic and directly proportional to the occupant's body weight within an established range, for example, as dictated by the spring sizes selected. The tilt force adjustment mechanisms described herein may, for example, be designed to adjust the tilt/recline force proportional to body weights within a range of 30 to 300 pounds, 40 to 275 pounds, or 50 to 250 pounds, in some examples.

As further described herein, the seat pan or "seat bottom" is configured to recline or tilt in response to passenger body weight (i.e., a load) and/or in connection with seatback recline. The terms "recline" and "tilt" as used herein with respect to the seat pan generally refer to seat pan movement in a direction from an upright sitting position or "upright position" in which the seat pan is nearest horizontal, to a more angled orientation relative to horizontal. In a preferred embodiment, seat pan tilt/recline in response to a load on the seat pan causes the rear of the seat pan to pivot downward.

Figure 1:
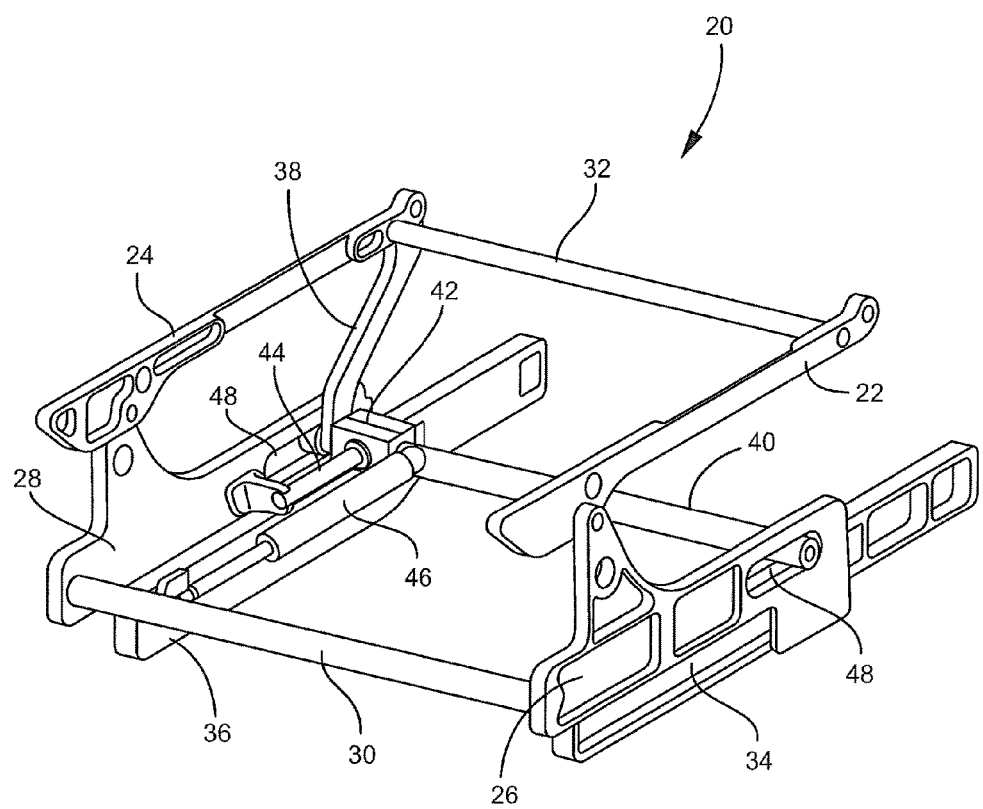
FIG. 1 is an isometric view of an example seat pan assembly.
Figure 2:
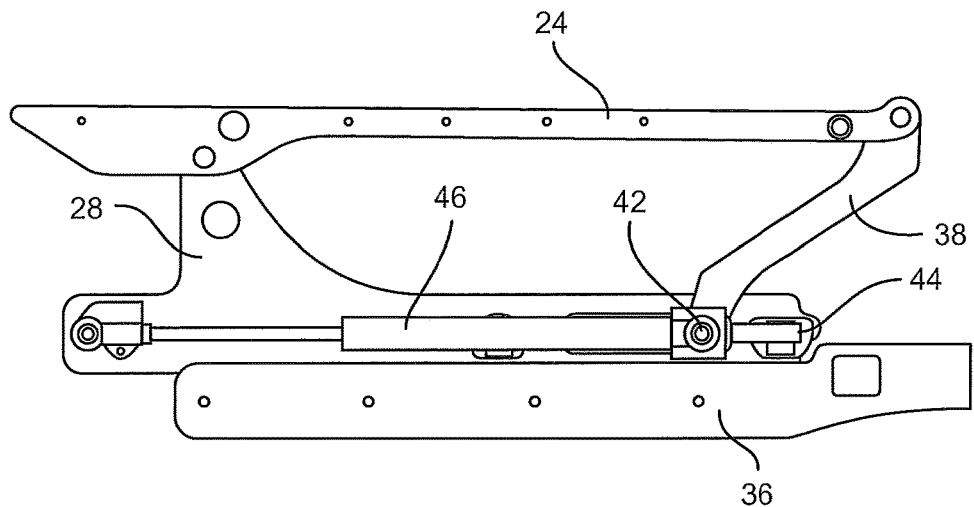
FIG. 2 is a side elevation view of the example seat pan assembly of FIG. 1.

FIGS. 1 and 2 show a first embodiment of a seat pan assembly 20 configured to be incorporated into an aircraft passenger seat. The seat pan assembly 20 generally includes spaced left and right seat pan members 22, 24 pivotably attached proximate their forward end to spaced left and right spreaders 26, 28. The seat pan members 22, 24 are primary support structure of the seat pan, which may further include springs (see FIG. 10), webbing or the like spanning transverse or longitudinally between the left and right seat pan members and/or other transverse seat pan members in order to support a seat cushion.

One or more of the spaced seat pan members 22, 24 and spaced spreaders 26, 28 may be interconnected through transverse structural members (e.g., beam tubes) to maintain the respective spaced components square and parallel during movement. As shown, the left and right spreaders are interconnected through a first fixed transverse structural member 30 positioned proximate the forward ends of the spreaders. The rear ends of the left and right seat pan members are interconnected through a second transverse structural member 32. In this arrangement, the left and right spreaders 26, 28 remain parallel as they translate horizontally relative to supportive left and right fixed seat frame members 34, 36, and the rearward end of the left and right seat pan members 22, 24 pivot together as the seat pan moves between upright and reclined.

A link 38, in some embodiments, interconnects the second transverse structural member 32 to a third transverse structural member 40 such that pivoting movement of the second transverse structural member 32 drives movement of the third transverse structural member 40. The link can 38 may be connected between the second and third transverse structural members 32, 40. As shown, the link 38 is pivotably attached at one end proximate the rear end of the one of the left and right seat pan members 22, 24, and at the other end to a carriage 42 that slides along a horizontal rail 44 fixed to the inboard side of one of the spreaders 26, 28. Links, carriages, and horizontal rails may be provided on one or more of the inboard sides of the spreaders. Left and right carriage assemblies may be interconnected through the third transverse structural member 40 to ensure that the left and right hand sides move together.

At least one gas spring 46, in some embodiments, is connected between the first transverse structural member 30 and the third transverse structural member 40. As the rear end of the seat pan pivots downward (i.e., toward recline) in response to a load on the seat pan, the link 38 drives the carriage 42 forward, moving the third transverse structural member 32 in the direction of the first transverse structural member 30 thereby compressing and loading the gas spring 46. The third transverse structural member 40 may be guided along elongate slots 48 defined in the left and right spreaders 26, 28. As the seat pan reclines, the third transverse structural member 40 is driven forward within the slots, and as the seat pan returns to upright the third transverse structural member 40 moves rearward in the slots. The range of pivoting movement of the seat pan can thus be controlled by customizing the length of the slots 48. Upon removal of the load from the seat pan, the gas spring 46 unloads by making use of the stored force in the gas spring to assist in returning the seat pan to upright.

Figure 3:
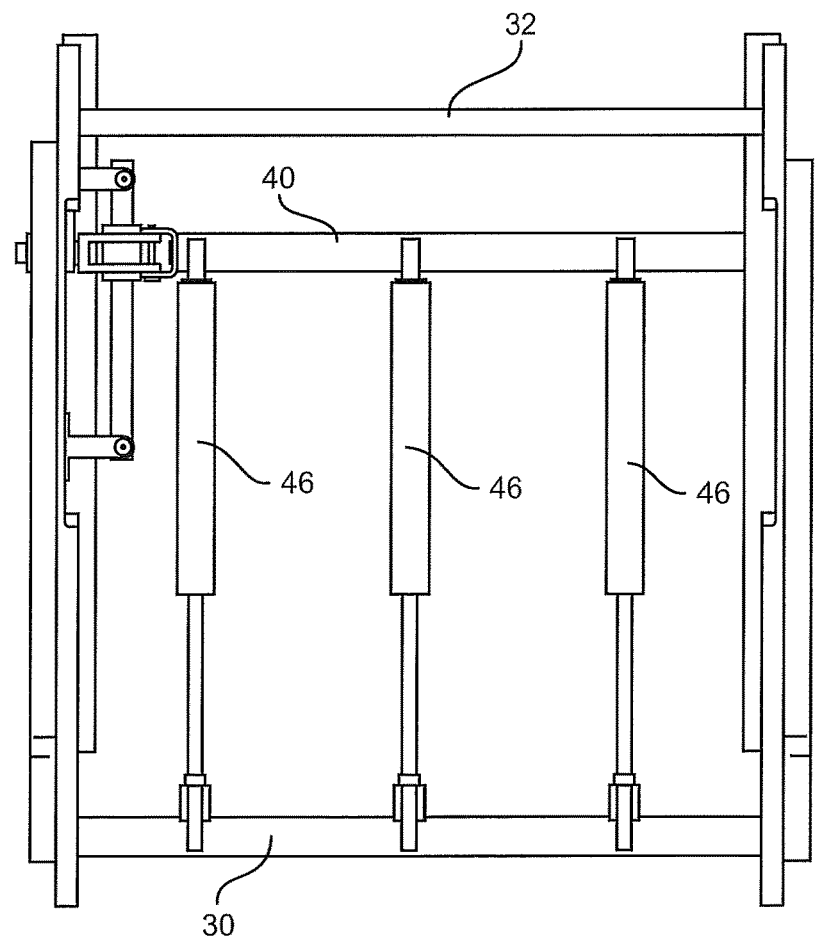
FIG. 3 is a top plane view of another example seat pan assembly incorporating multiple gas springs.

FIG. 3 shows an alternative seat pan assembly embodiment including three equally spaced gas springs 46.

Figure 4:
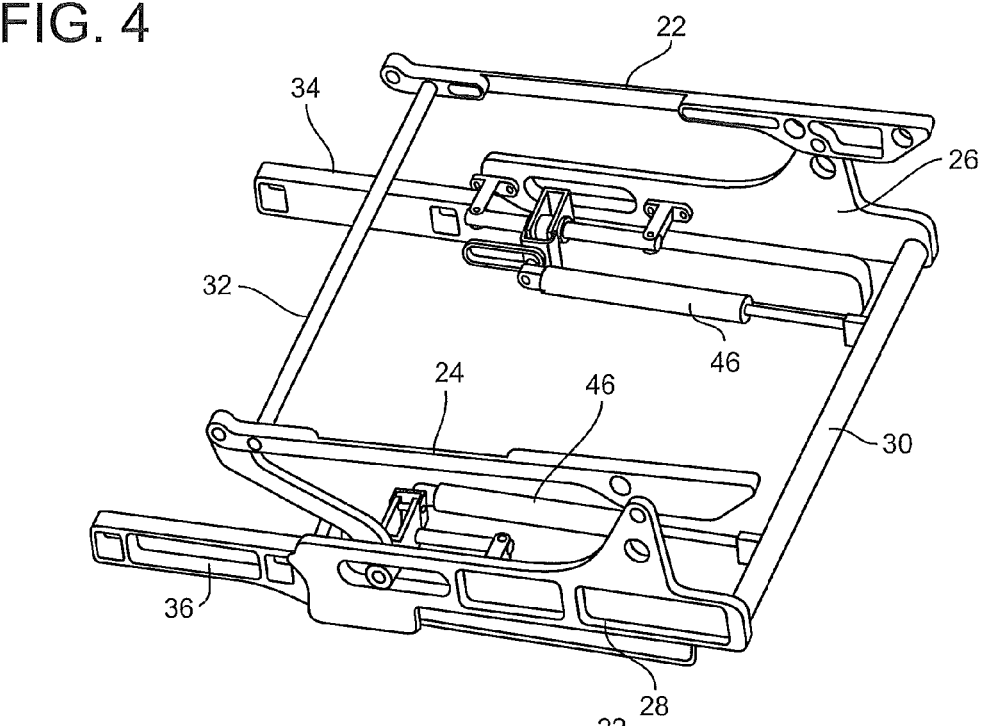
FIG. 4 is an isometric view of a further example seat pan assembly incorporating left and right side gas springs.

FIG. 4 shows an alternative seat pan assembly embodiment including left and right side gas springs 46 and the seat pan in the upright sitting position.

Figure 5:
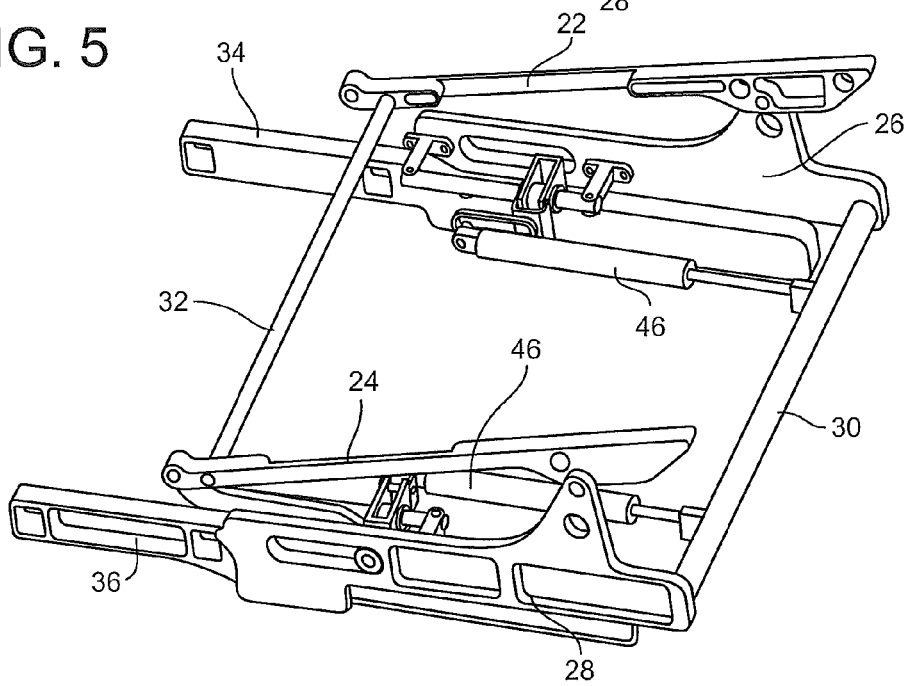
FIG. 5 shows the seat pan assembly of FIG. 4 in a tilted/reclined sitting position.

FIG. 5 shows the seat pan assembly of FIG. 4 with the seat pan in the reclined or tilted sitting position.

Figure 6:
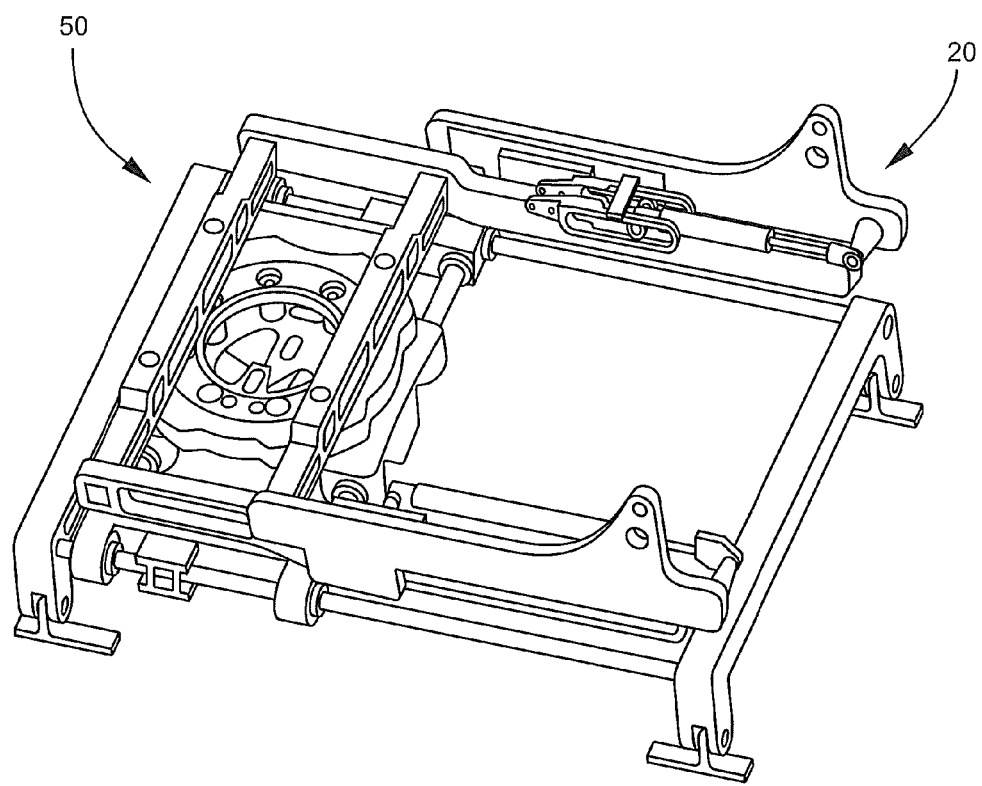
FIG. 6 shows an example seat pan assembly mounted for horizontal translation on a seat base frame.

FIG. 6 shows the seat pan assembly mounted for horizontal translation on an underlying seat base frame 50. The seat pan assembly 20, in some embodiments, can be configured to translate horizontally as well as pivoting into a recline position.

FIGS. 7A-7D show a variety of exemplary weight sensing mechanisms and tilt force adjustment mechanisms that may be incorporated into an aircraft passenger seat for adjusting the tilt/recline force of the seat pan. In each of the illustrated embodiments, the tilt force adjustment assembly may include a first compression element (gas spring, as illustrated) as a primary tilt/recline actuator with the strength adequate to allow the seat to tilt/recline under low passenger body weight. The assembly may further include a second compression element (helper spring, as illustrated) incorporated in the seat pan area arranged to deflect under any and all passenger body weight.

In some embodiments, the first compression element can be any tensioner device having a locking function and an unlocking function to lock and to unlock the travel of a rod along a stroke course, where the locking and unlocking can be implemented at any desirable location along the stroke course. For example, the first compression element can be a hydraulic tensioner where the locking function and the unlocking function are implemented through valves actuated by a release pin to disable and enable hydraulic fluids to flow through a piston connected to the rod. The hydraulic fluids can be gases, e.g., air or nitrogen, fluids, e.g., mineral oils, synthetic oils, or water, or the combination of both. In this manner, rather than actuating between a first position and a second position, the passenger seat recline feature may be adjustable along a number of incremental positions in a path between a first position and a second position.

In certain embodiments, the first compression element can have an elastic locking function to provide better damping and comfort to a passenger. For the elastic locking function, once the rod is locked at the desirable location, the rod can be pushed and pulled when a predetermined amount of force is applied to the rod. For example, the elastic locking function can be implemented via a floating piston placed around the rod to separate two different hydraulic fluids, e.g. air and oil. In certain embodiments, the compression element can have a rotary damper that is only engaged during the first few degrees of motion as the seat leaves the upright position.

Furthermore, in some embodiments, the first compression element can include a telescopic mechanism to extend the stroke course of the rod and increase the articulation of the seat back.

Those skilled in the art will recognize that, although the second compression element, identified as helper spring 58, is shown in the drawings as a coil (helical) spring, in other embodiments, other types of springs, or additional gas springs, may be effectively employed in place of, or in addition to, a coil spring.

The weight sensing mechanisms, in some embodiments, may be configured to trigger tilt force adjustment such that the amount of spring deflection of the second compression element (e.g., helper spring 58) may increase with an increase in passenger body weight. The assembly may use passenger body weight to adjust the helper spring force by limiting the compression travel of the helper spring 58 as the passenger body weight increases. Hence, heavier seat occupants engage the helper spring 58 sooner than lighter ones, thus realizing increased spring force in addition to the primary gas spring force provided by the gas spring 56. This added force may be used to react to the increased body weight to allow the occupant to tilt/recline and return the seat pan to the upright sitting position for taxi, takeoff and landing. In this arrangement, the adjustment of the tilt/recline force is automatic and directly proportional to the seat occupant's body weight within an established range, as dictated by the spring sizes selected.

In further embodiments, a compression spring may be used in place of gas spring 56 to provide the primary return force for the tilt-recline force adjusting mechanism, and a gas spring may be used in place of helper spring 58. In such embodiments, the gas spring may be configured such that the amount of return force provided may increase with an increase in passenger body weight.

Figure 7A:
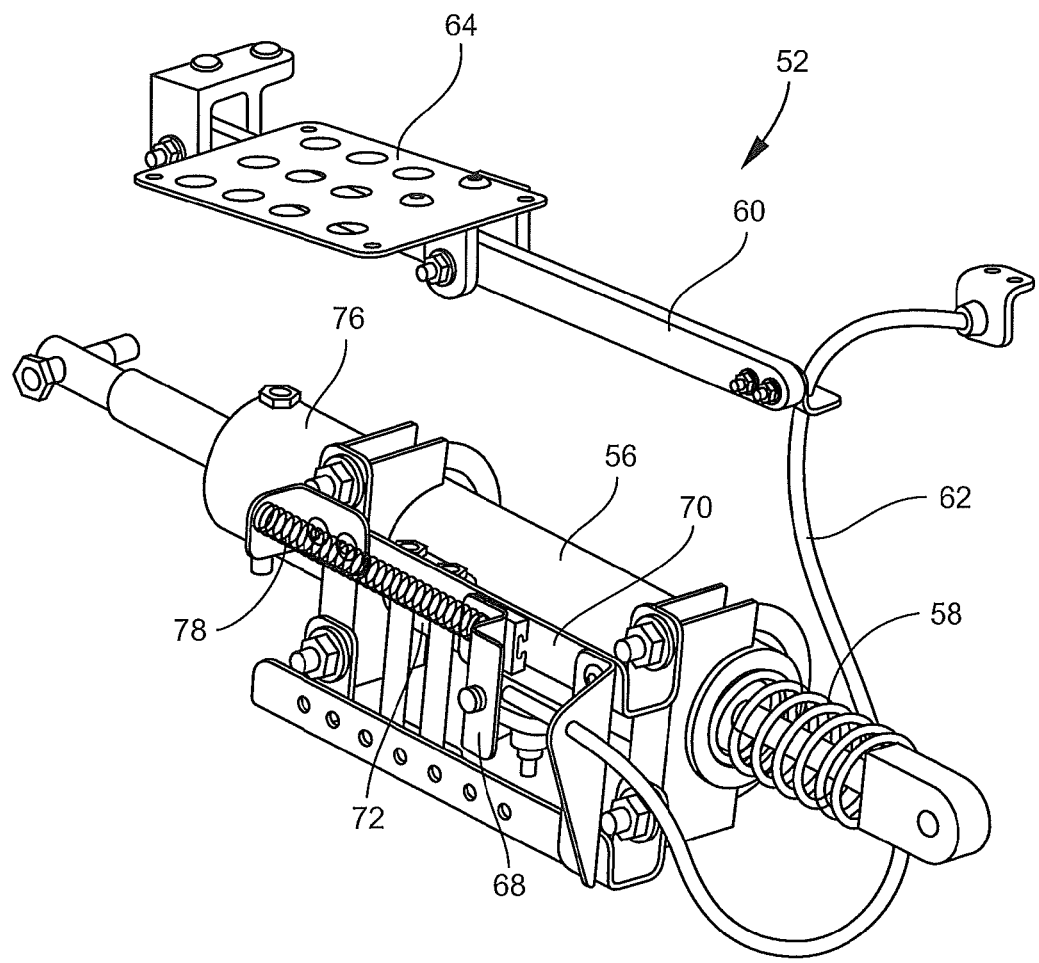
FIG. 7A is a perspective view of an example weight sensing mechanism for an aircraft seat pan.
Figure 10:
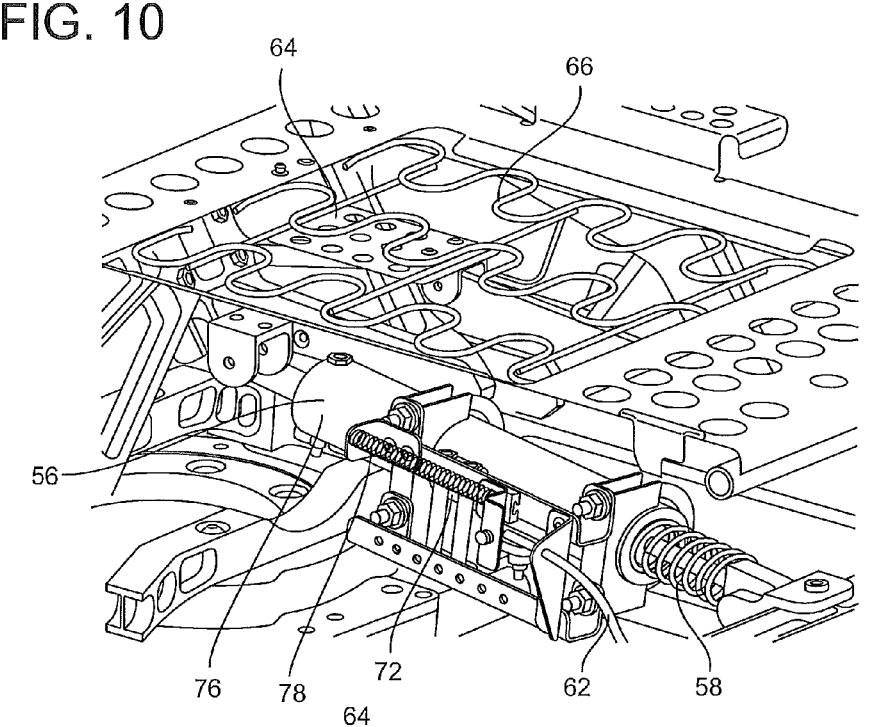
FIG. 10 is a detailed view of the weight sensing mechanism and seat base frame of FIG. 7A.

Referring now to FIG. 7A, the weight sensing mechanism 52, in some embodiments, may include gas spring 56, a helper spring 58, a lever 60, a cable 62 (a Bowden cable, for example), and a plate 64. In some embodiments, the helper spring 58 is mounted forward of and coaxial with the gas spring 56. In other embodiments, the helper spring 58 is disposed in part between an outer sleeve of the gas cylinder of the gas spring 56 and an inner sleeve of the gas cylinder (described in more detail in relation to FIG. 12B). A weight sensor may be formed by plate 64, adapted to attach to the underside of the seat pan, for example, to the underside of the seat pan springs 66 as shown in FIG. 10. The lever 60 is attached to the plate 64 such that the lever 60 is attached at one end to the seat pan and at the opposite end to the cable 62. In operation, when a passenger sits down, the lever 60 may be depressed (in proportion to the weight of the passenger), thereby pulling on the cable 62 an amount proportional to the weight of the passenger, causing adjustment of a tilt-recline return force to help return the seat to the upright sitting position.

Figure 7B:
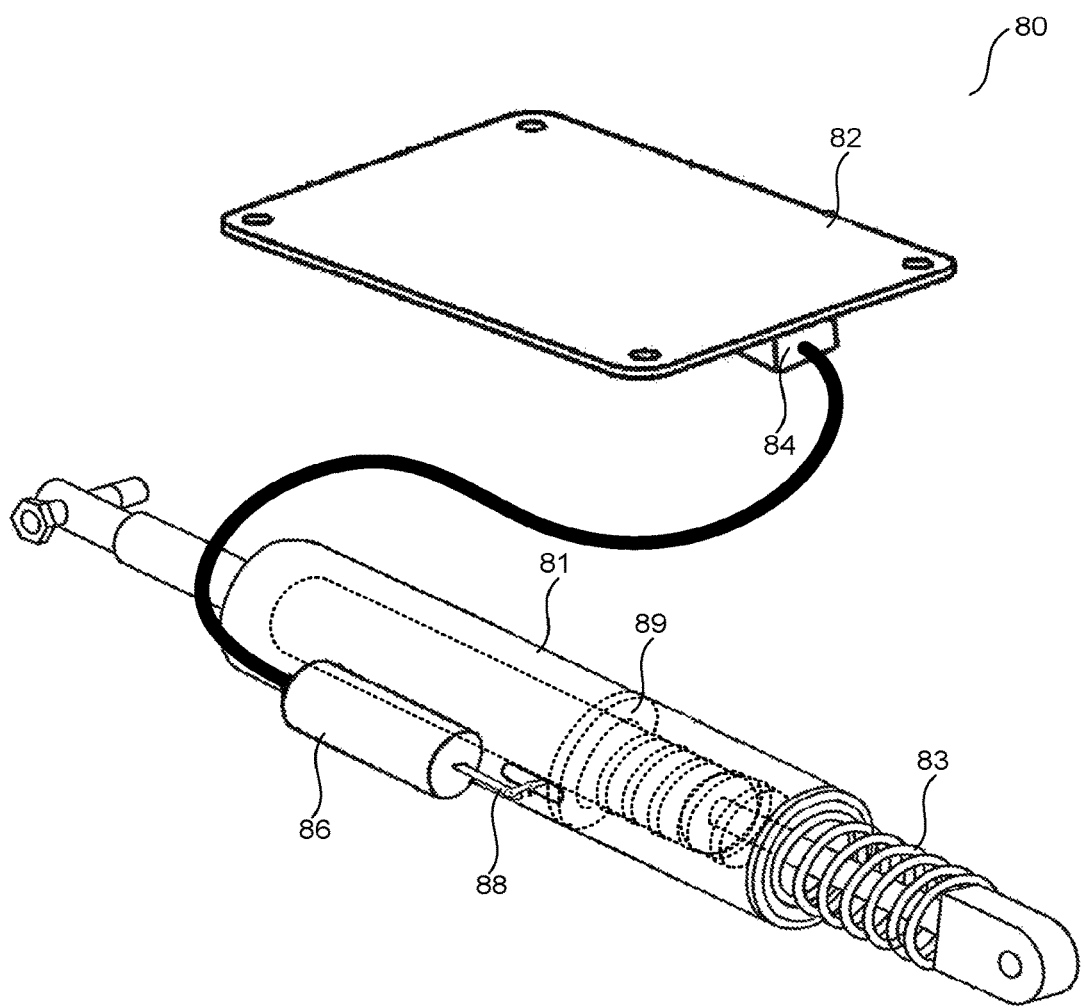
FIG. 7B is a perspective view of another example weight sensing mechanism for an aircraft seat pan.
Figure 7C:
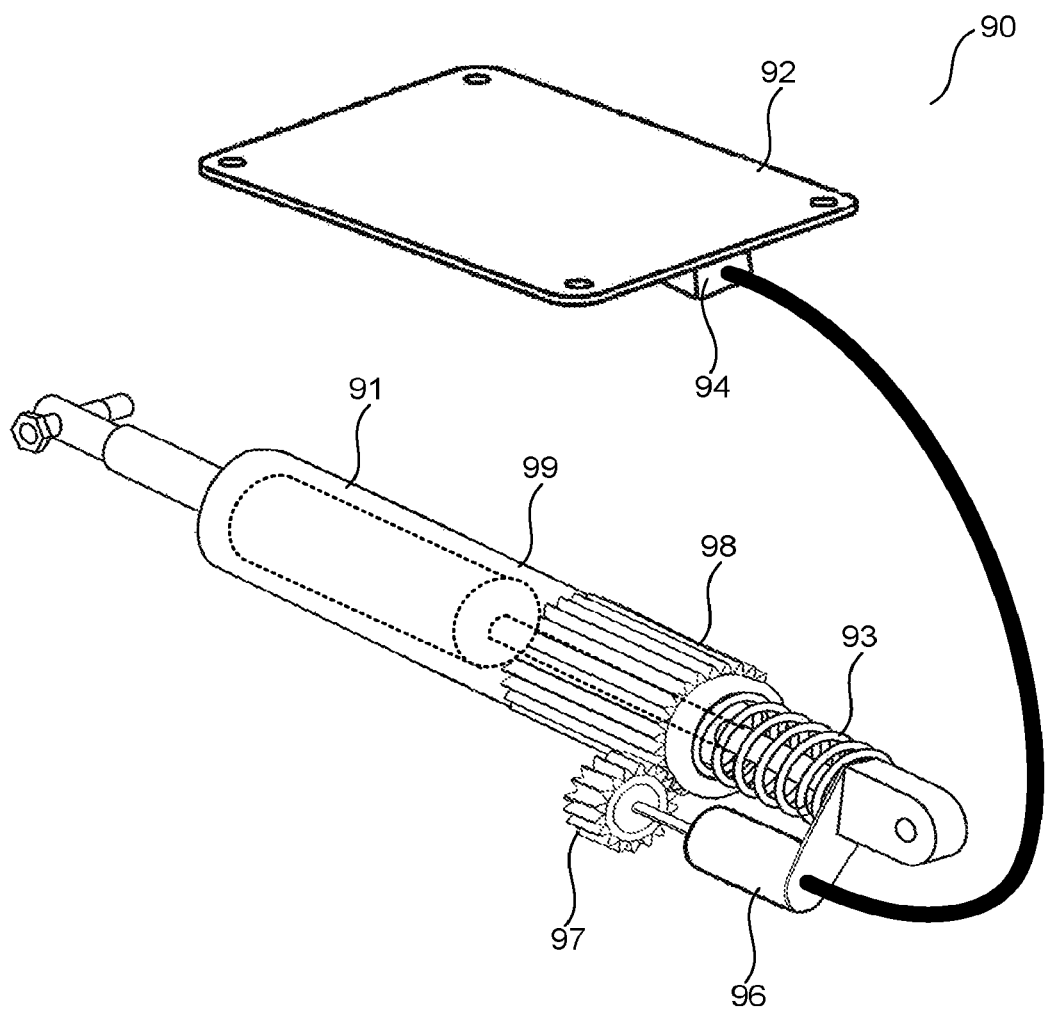
FIG. 7C is a perspective view of yet another example weight sensing mechanism for an aircraft seat pan.

In some implementations, the cable 62 triggers a tilt-recline adjustment mechanism configured to adjust compression force of the second compression element. For example, as illustrated in FIGS. 7A through 7C, the tilt-recline adjustment mechanism varies compression of the helper spring 58 in a manner proportional to the weight of the passenger. Heavier seat occupants thus engage the helper spring 58 sooner, thus realizing increased spring force in addition to the primary gas spring force provided by gas spring 56.

Figure 11A:
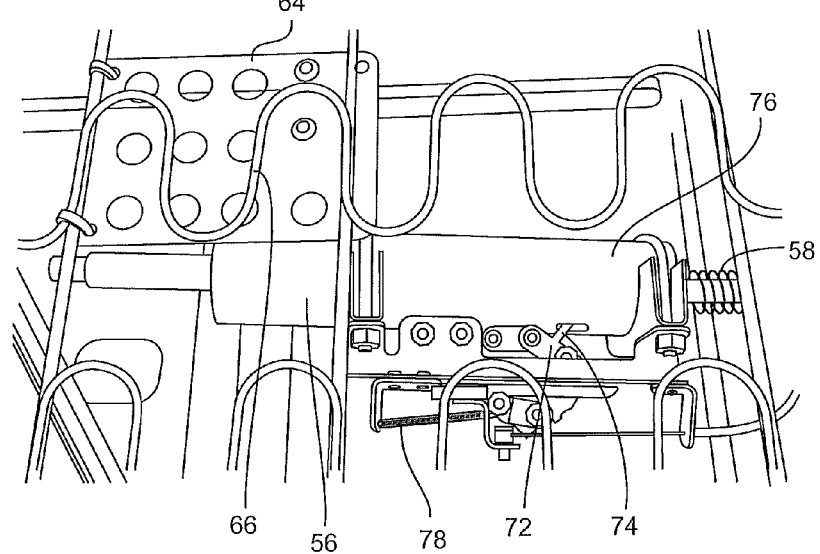
FIG. 11A is another detailed view of the weight sensing mechanism showing the engagement of a chain with a gas cylinder.

Returning to FIG. 7A, in some implementations, the cable 62 is attached to a bracket 68 that slides along a rail 70, thereby pulling an attached chain 72 (more clearly illustrated in FIG. 11A) along therewith. As best shown in FIG. 11A, one or more stops 74 such as the lateral projections shown on certain ones of the chain links extend through openings in the outer cylinder 76 of gas spring 56 to limit the compression of the helper spring 58. In operation, as the cable 62 pulls on the bracket 68, the chain 72 is pulled by the rail 70, chain rotating in a counter-clockwise fashion, moving the stops 74 into communication with one or more openings in the outer cylinder 76 of the gas spring 56.

In some embodiments, the outer cylinder 76 is maintained in a fixed position, the helper spring 58 extends within the outer cylinder 76, and the stop 74 inserts into an opening of the outer cylinder 76 to adjust a position of an internal slidable stop ring forming a boundary between the helper spring 58 and an inner cylinder of the gas spring 56.

Figure 12A:
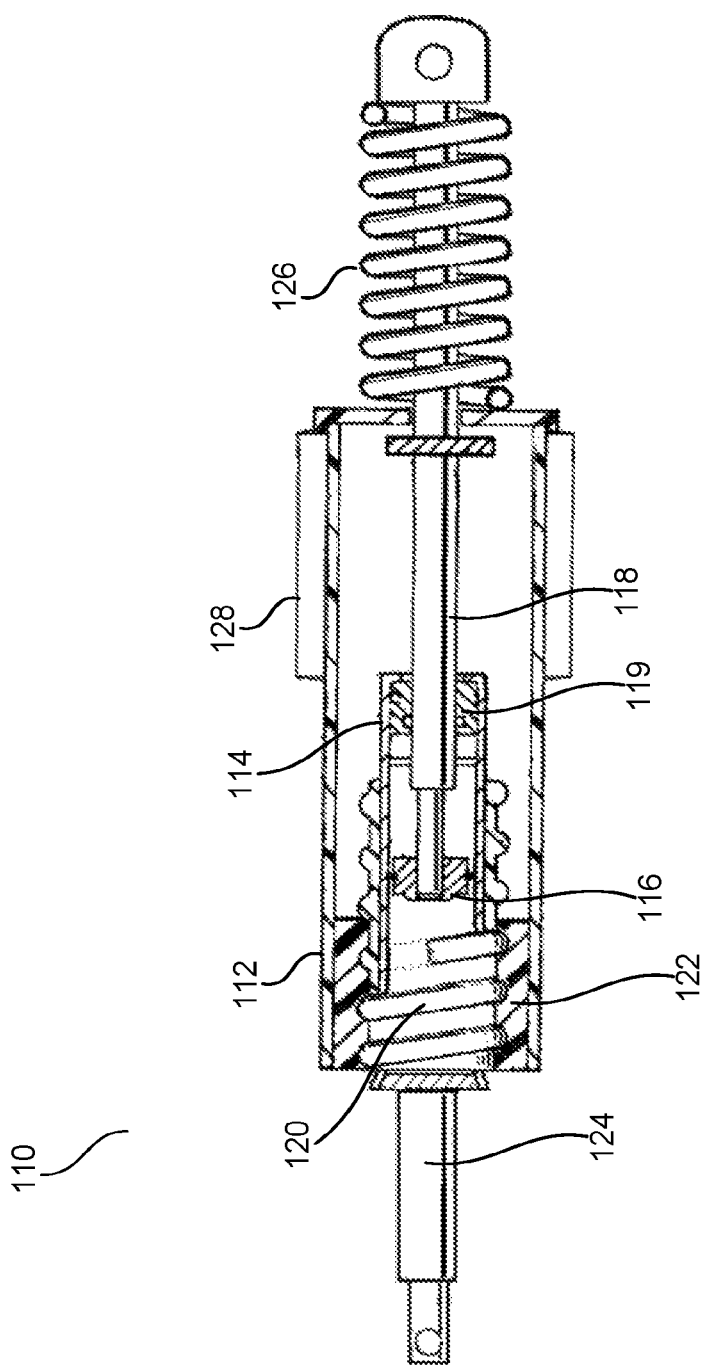
FIG. 12A is a partial cross sectional view of a gas spring assembly that may be used in some embodiments of the present disclosure.
Figure 12B:
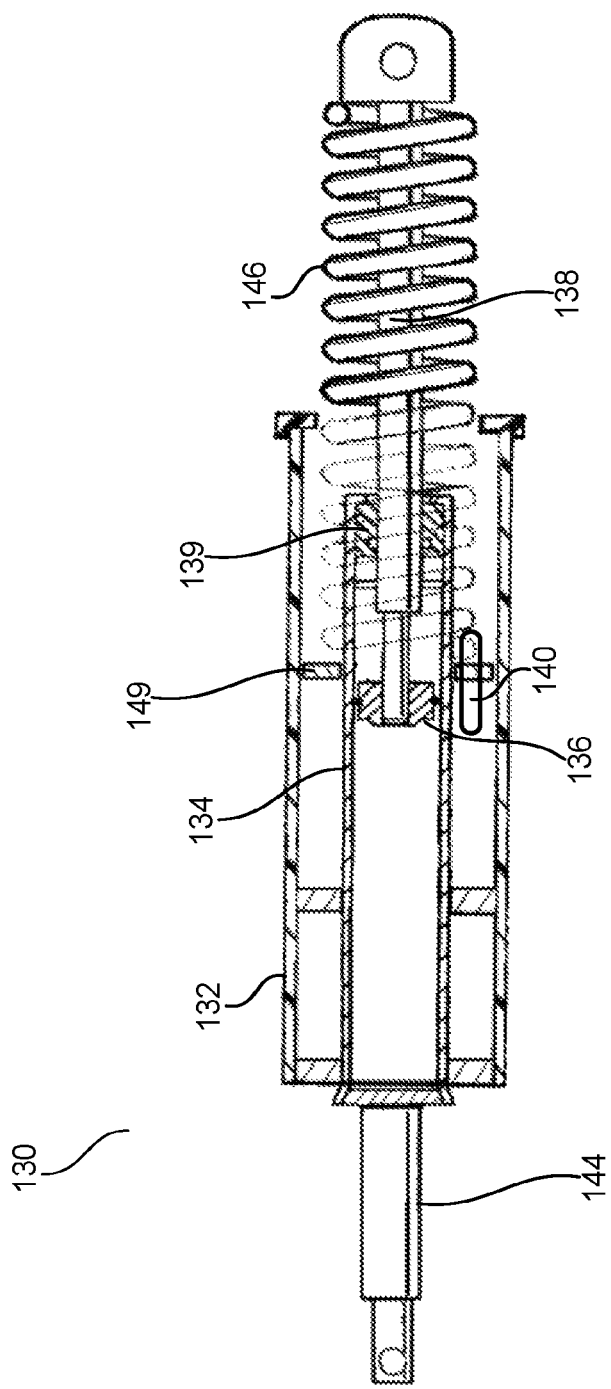
FIG. 12B is a partial cross sectional view of another gas spring assembly that may be used in some embodiments of the present disclosure.

Turning to FIG. 12B, for example, a gas spring assembly 130, in some implementations, includes an inner cylinder 134, an outer cylinder 132, a slidable stop ring 149, and an embedded helper spring 146. The slidable stop ring 149, for example, may be a washer or other ring element configured as an end stop for helper spring 146. The stop 74 (illustrated in FIG. 11A), for example, may engage slidable stop ring 149, translating it from a first position to a second position. The heavier the passenger, the closer the slidable stop ring 149 is drawn to the open end of outer cylinder 132, increasing the compression force of the helper spring 146.

In other embodiments, returning to FIG. 7A, the helper spring 58 abuts an end of the outer cylinder 76. When the passenger moves the seat into the recline position, the gas spring 56 is compressed and the cylinder 76 travels towards the front of the seat pan, compressing the helper spring 58. Simultaneously, the cable 62 causes the bracket 68 to move the chain 72 into position such that, at the point where the helper spring force 58 is at equilibrium with the proportional passenger weight, the stops 74 lock a lateral position of the outer cylinder 76. The stops 74, in locked position, maintain a set compression force of the helper spring 58 by limiting further compression travel of the helper spring 58 (otherwise compressed through movement of the cylinder 76. Heavier seat occupants thus engage greater compression of the helper spring 58, thus realizing increased spring force in addition to the primary gas spring force provided by gas spring 56.

In some embodiments, a return spring 78 is arranged to return the chain 72 to a "neutral" position when the seat is unoccupied. For example, as the bracket 68 is drawn toward the helper spring 58, the return spring 78, connected at one end to the bracket 68, is extended in length. When the passenger weight is removed, the cable 62 releases the bracket 68, and the return spring 78 draws the bracket 68 back up the rail 70 until the return spring 78 reaches neutral position.

Figure 8:
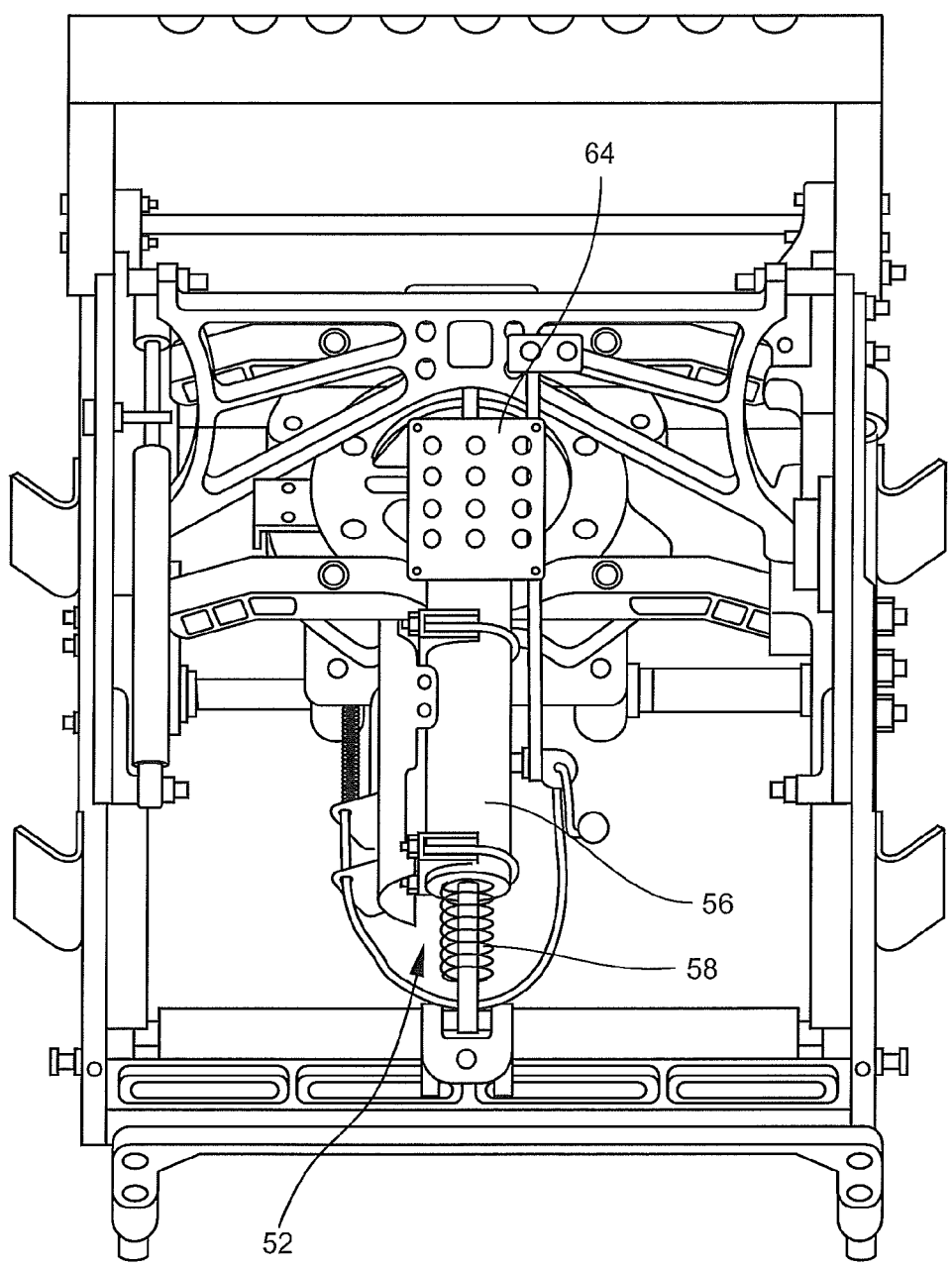
FIG. 8 is a top plan view showing the weight sensing mechanism of FIG. 7A installed on a seat base frame.
Figure 9:
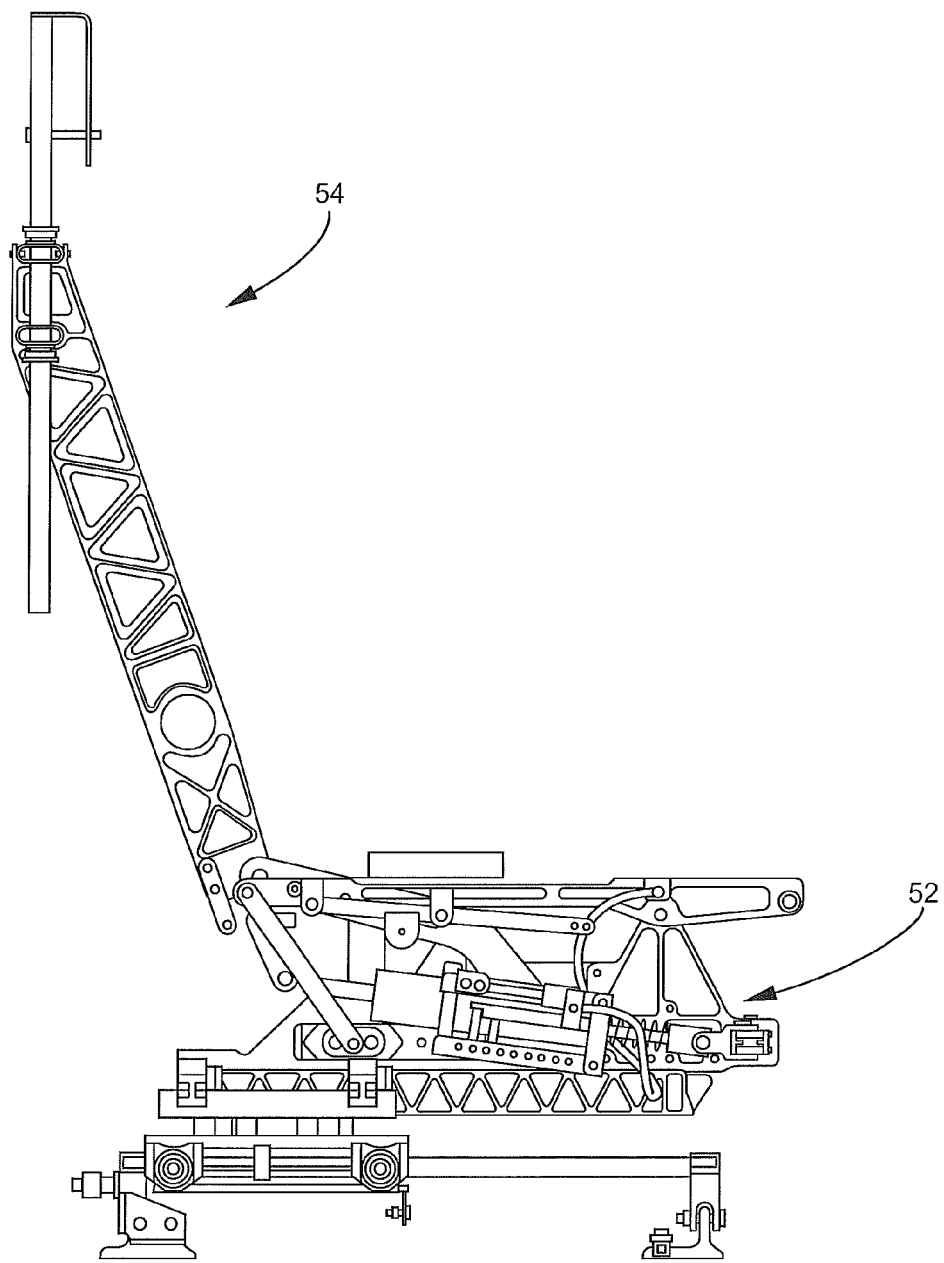
FIG. 9 is a side elevation view of an aircraft seat frame including the weight sensing mechanism of FIG. 7A.

FIG. 8 illustrates a top plan view showing the weight sensing mechanism of FIG. 7A installed on a seat base frame, FIG. 9 illustrates a side elevation view of an aircraft seat frame including the weight sensing mechanism of FIG. 7A, FIG. 10 illustrates a detailed view of an aircraft seat frame including the weight sensing mechanism of FIG. 7A, and FIG. 11A illustrates another detailed view of the weight sensing mechanism showing the engagement of the chain 72 with gas spring 56.

Referring now to FIG. 7B, the weight sensing mechanism 80, in some embodiments, may include a weight sensing mat 82 and electronic circuitry 84, while the tilt force adjustment mechanism includes gas spring 81, a helper spring 83, an actuator 86, and a linkage 88. The helper spring 83, for example, may be mounted forward of and coaxial with the gas spring 81. The weight sensing mat 82 (weight sensor) may be positioned in or under a seat cushion such that it may sense the weight of a seated passenger. Electronic circuitry 84 in communication with (e.g., attached to, or integrated with, etc.) the weight sensing mat 82 may be configured to drive actuator 86. Actuator 86 may mounted on or proximate to gas spring 81 and may be configured to adjust the action of gas spring 81 through linkage 88 in proportional response to the weight of the seated passenger sensed by weight sensing mat 82, thereby limiting the compression travel of the helper spring 83.

In some embodiments, actuator 86 and linkage 88 may be configured to preload (compress) helper spring 83 by moving slidable stop ring 89 in proportion to the weight of the seated passenger. This action may allow helper spring 83 to be engaged sooner, thus realizing increased spring force in addition to the primary gas spring force provided by gas spring 81.

In other embodiments, actuator 86 and linkage 88 may be configured to limit the travel of gas spring 81 by adjusting the volume inside the cylinder of gas spring 81 using, for example, a sliding disk within a cylinder of gas spring 81. In further embodiments, actuator 86 and linkage 88 may be configured to adjust a hard stop on the piston rod of gas spring 81 or adjust an orifice within gas spring 81.

In some embodiments, weight sensing mat 82 may use capacitive sensors to sense the weight of the seated passenger. Capacitive weight sensors may include one or more capacitive load cells, each load cell having a deflectable or deformable dielectric layer between thin, flexible electrodes. Constructed in this manner, the capacitance of each load cell may vary in proportion to the weight on the corresponding load cell. Capacitance of the load cells may be measured by techniques well known in the art. The measured capacitance values from the load cells may be processed and mapped to control actuator 86. In some implementations, electronic circuitry 84 may be integrated into a flexible circuit as part of the capacitive load cells. Capacitive weight sensors may be particularly resistant to harsh environments and provide long life.

In other embodiments, weight sensing mat 82 may use piezoresistive technology to sense the weight of the seated passenger. Piezoresistive materials may display a change in electrical resistance in response to pressure applied to the material. The piezoresistive material may be fabricated into a variety of woven and non-woven fabrics. Weight sensors made from piezoresistive fabrics may also include conductive wiring formed on or attached to the piezoresistive material. The resistance of the piezoresistive material may be measured through the conductive wiring by techniques well known in the art. The measured resistance values from the conductive wiring may be processed and mapped to control actuator 86. In some implementations, electronic circuitry 84 may be integrated into a flexible circuit as part of the piezoresistive fabric. Piezoresistive fabrics may be particularly applicable to passenger weight sensors for aircraft seats since they can be readily integrated into the cushion material.

In yet other embodiments, weight sensing mat 82 may use one or more resistive strain gauge sensors. In a resistive strain gauge sensor, force or pressure is sensed based on strain (dimensional changes) placed on resistive elements. Multiple resistive strain gauge sensors may be mounted into a seat structure, along with straps in or under the seat cushion, to produce accurate weight measurements. The resistance of the resistive strain gauge sensors may be measured by techniques well known in the art. The measured resistance values from the sensors may be processed and mapped to control actuator 86. Due to the need for mounting and strapping structures, integrating resistive strain gauge sensors into aircraft seats may present some technical challenges over that of capacitive or piezoresistive sensors.

In some embodiments, actuator 86 may be implemented using a linear actuator. A linear actuator, well known in the art, may include a DC motor or stepper motor and a rotary-to-linear motion converter (a rack and pinion gear mechanism or a ball screw, for example). A linear actuator may produce a linear translational motion of a shaft or plate. In examples illustrated in FIG. 7B, a linear actuator may be employed as actuator 86 to translate linkage 88 which, in turn may adjust a ring within gas spring 81 as shown in FIG. 12B and more fully described below.

In some embodiments, actuator 86 may be a rotary actuator. A rotary actuator may include a stepper motor or servomotor (DC motor plus position feedback). In such an implementation, linkage 88 may incorporate a leadscrew and nut mechanism to adjust a slidable stop ring within gas spring 81 as shown in FIG. 12B and more fully described below.

Figure 11B:
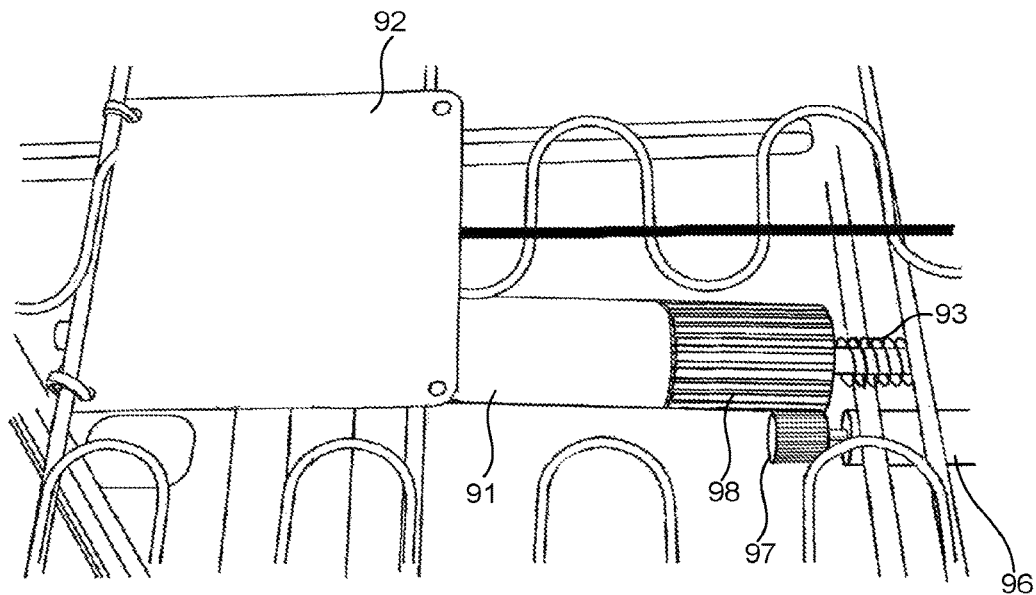
FIG. 11B is another detailed view of the weight sensing mechanism showing the engagement of a motor-driven gas cylinder adjustment system.

Referring now to FIGS. 7C and 11B, the weight sensing mechanism 90, in some embodiments, may include a weight sensing mat 92 and electronic circuitry 94, while the tilt force adjustment mechanism includes a gas spring 91, a helper spring 93, an actuator 96, and a gear 97. Electronic circuitry 94 in communication with (e.g., attached to, or integrated with, etc.) weight sensing mat 92 (weight sensor) may be configured to drive actuator 96 in proportion to the weight of a seated passenger. Actuator 96 may include a shaft and a gear 97 mounted to the shaft. Gear 97 may be positioned to mesh with gear feature 98 on gas spring 91. In some embodiments, rotation of actuator 96 may drive gear 97 which, in turn, may drive gear feature 98 on gas spring 91 to rotate the outer cylinder 99 of gas spring 91. Rotation of the outer cylinder 99 of gas spring 91 may cause an inner cylinder of gas spring 91 to emerge and effectively lengthen gas spring 91. This action may compress helper spring 93 to allow helper spring 93 to be engaged sooner, thus realizing increased spring force in addition to the primary gas spring force provided by gas spring 91. A more detailed description of a gas spring 91 that may be used in some implementations as illustrated in FIG. 7C may be found below with respect to FIG. 12A.

In some embodiments, actuator 96 may be a stepper motor. A stepper motor, as is well known in the art, is a DC electric motor Stepper motors are DC motors that move in discrete steps. Stepper motors typically have multiple coils that are organized into phase groups. By energizing each phase in sequence, the motor may rotate, one step at a time. Very precise open-loop positioning may be achieved and the motor may be positioned and held at any one of the steps without a feedback sensor. The control circuitry for driving a stepper motor may be somewhat more complex that that required to drive a simple DC motor, and a stepper motor may have a higher cost and use more power than a simple DC motor, but the mechanical simplicity of the stepper motor is an important advantage.

In other embodiments, actuator 96 may be a servomotor. A servomotor, as is well known in the art, may include a DC motor, a gear train (to decrease speed and increase torque, for example), and position feedback (a shaft encoder, for example). A packaged servomotor may have a very simple electronic interface and produce extremely accurate positioning.

Figure 7D:
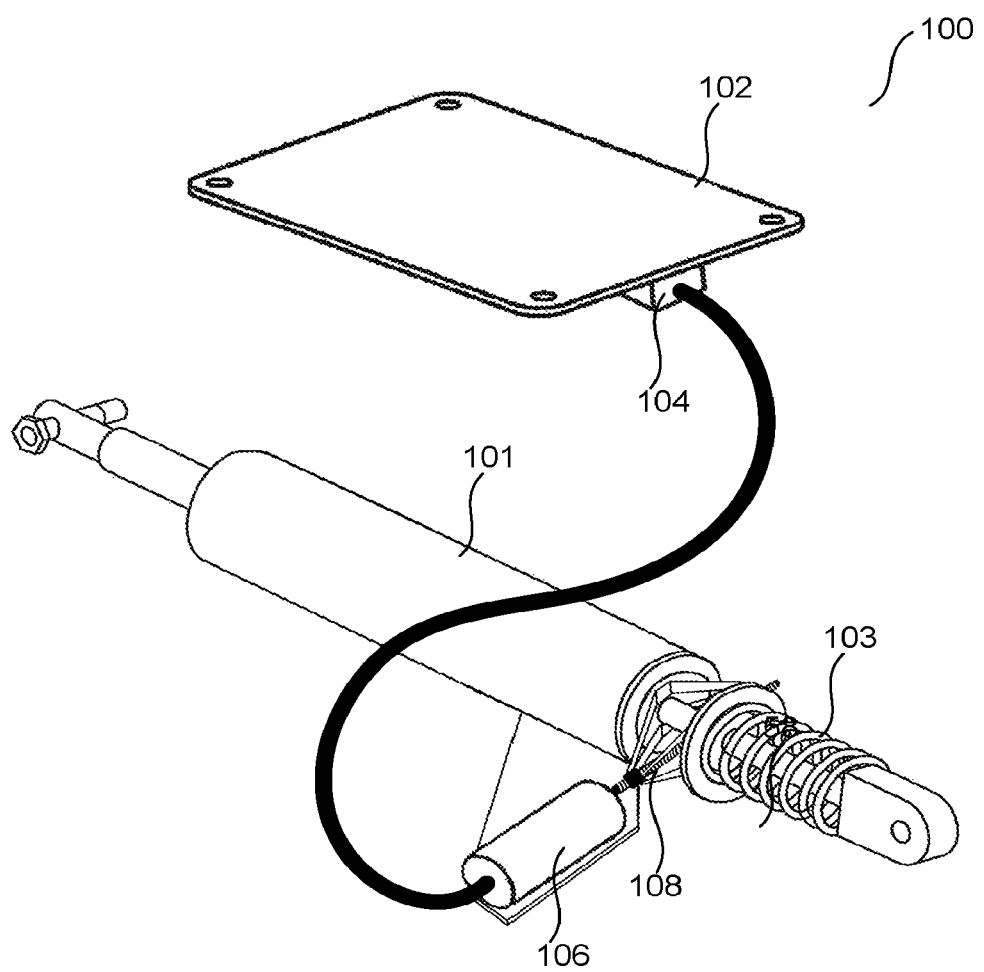
FIG. 7D is a perspective view of yet another example weight sensing mechanism for an aircraft seat pan.
Figure 11C:
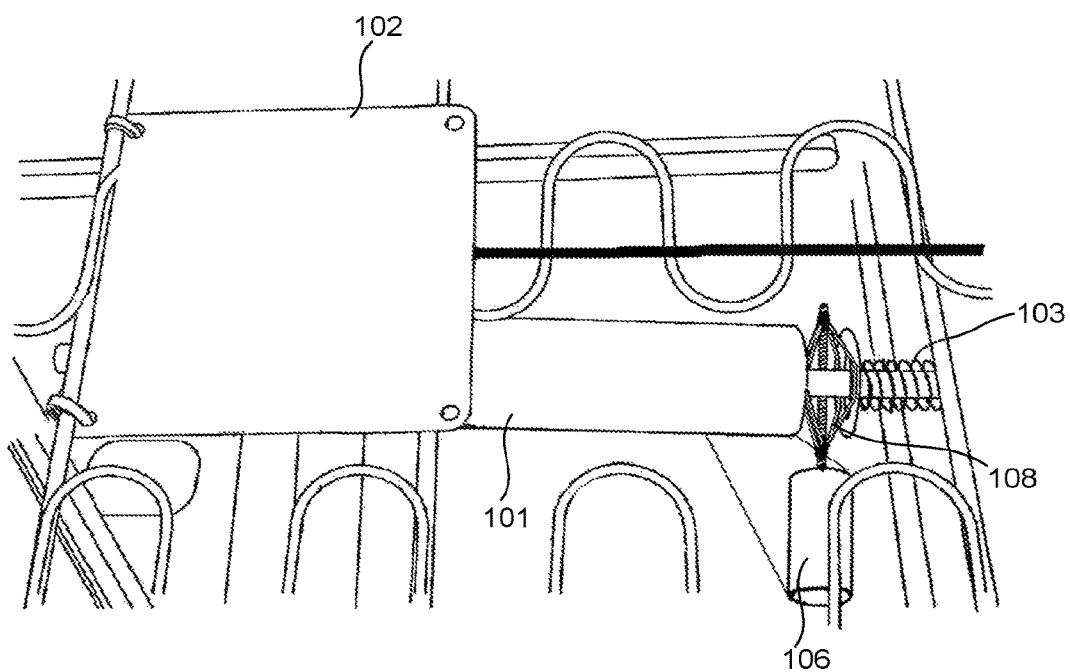
FIG. 11C is another detailed view of the weight sensing mechanism showing the engagement of a motor-driven gas cylinder adjustment system.

Referring now to FIGS. 7D and 11C, the weight sensing mechanism 100, in some embodiments, may include a weight sensing mat 102 (weight sensor) and electronic circuitry 104, while the tilt force adjustment mechanism includes a gas spring 101, a helper spring 103, an actuator 106, and a leadscrew scissors mechanism 108. Electronic circuitry 104 in communication with (e.g., attached to, or integrated with, etc.) weight sensing mat 102 may be configured to drive actuator 106 in proportion to the weight of a seated passenger. Actuator 96 (which may be a stepper motor or servomotor, as described above with reference to FIG. 7C) may be mounted to gas spring 101 and may drive leadscrew scissors mechanism 108. Leadscrew scissors mechanism 108 may be configured to preload (compress) helper spring 103 in proportion to the weight of the seated passenger. This action may allow helper spring 103 to be engaged sooner, thus realizing increased spring force in addition to the primary gas spring force provided by gas spring 101.

In implementations like those illustrated in FIGS. 7B-7D, a weight sensing mechanism may include electronic circuitry that processes inputs from a weight sensor (a weight sensing mat, for example) and drives an actuator to adjust a return force for a tilt-recline force adjusting mechanism. In some embodiments, the electronic circuitry may also include a time averaging circuit, or equivalent function, that may time average (smooth) the weight sensor input to reduce the effect of passenger movement and/or seat bounce. This time averaging would reduce or eliminate spurious adjustments of the actuator.

FIG. 12A is a partial cross sectional view of a gas spring assembly 110 that may be used in some embodiments of the present disclosure. Gas spring assembly 110 may include an outer cylinder 112, an inner cylinder 114, and a piston 116 connected to an end of a piston rod 118. In some embodiments, the inner cylinder 114 may be sealed and charged with an inert gas such as nitrogen. One end of the inner cylinder 114 may have a cylindrical sliding seal 119 through which piston rod 118 passes. In some embodiments, the inner cylinder 114 may include external thread feature 120, which may engage with a sleeve with internal thread features 122. Sleeve with internal thread features 122 may be fixedly mounted internal to an end of outer cylinder 112. Rod 124 may be fixedly attached to the closed end of inner cylinder 114. In some embodiments, helper spring 126 may be mounted coaxial with piston rod 118. And in some embodiments, gear feature 128 may be fixedly attached around, or machined into the outer surface of, a portion of outer cylinder 112. Gas spring assembly 110 may be employed, for example, in an implementation such as that illustrated in FIGS. 7C and 11B. In operation, with rod 124 and piston rod 118 mounted to transverse beams of a seat pan, rotation of outer cylinder 112 may cause inner cylinder 114 to extend out from outer cylinder 112, causing helper spring 126 to compress.

FIG. 12B is a partial cross sectional view of another type of gas spring assembly 130 that may be used in some embodiments of the present disclosure. Gas spring assembly 130 may include an outer cylinder 132, an inner cylinder 134, and a piston 136 connected to an end of a piston rod 138. In some embodiments, the inner cylinder 134 may be sealed and charged with an inert gas such as nitrogen. One end of the inner cylinder 134 may have a cylindrical sliding seal 139 through which piston rod 138 passes. In some embodiments, helper spring 146 may be mounted coaxial with piston rod 138 and enter an opening in one end of outer cylinder 132. A slidable stop ring 149 may be positioned between the inner wall of outer cylinder 132 and the outer wall of an inner cylinder 134. The slidable stop ring 149 may be adjusted to compress helper spring 146 to a return force provided by gas spring assembly 130. An opening 140 may be provided in outer cylinder 132 to allow access to slidable stop ring 149 for the purpose of adjusting its position. Gas spring assembly 130 may be employed, for example, in implementations such as those illustrated in FIGS. 7A, 7C and 11A.

In some embodiments, multiple gas spring assemblies may be arranged in a parallel structure to enhance the functionality and/or increase the capacity of the weight sensing mechanism for an aircraft seat. Referring again to FIGS. 3, 4 and 5, in some embodiments, three (FIG. 3) or two (FIGS. 4 and 5) gas spring assemblies, such as those illustrated in FIGS. 7A-7D, may be substituted for gas springs 46. In such embodiments, the return force of each of the gas spring assemblies may be adjusted together, or may be adjusted separately to provide additional control over return force and balance. The gas spring assemblies, in one example, may include equally spaced gas springs of matching specification, for example for simultaneous adjustment. In another example, the gas spring assemblies may include varying force ranges such that a first gas spring is activated and adjusted based upon a first passenger weight range, and a second gas spring is activated and adjusted based upon a second passenger weight range. In a particular example, a first gas spring may be always activated, while additional gas springs in the gas spring assembly are activated upon meeting threshold passenger weight ranges.

In additional embodiments, two or more gas spring assemblies may be connected in tandem (end-to-end) to provide additional capacity and/or control of return force. In such embodiments, each of the gas spring assemblies may be separately controlled to achieve a desired return force.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A tilt-recline force adjusting apparatus for an aircraft seat configured for manual tilt-recline positioning, the tilt-recline force adjusting apparatus comprising:
  a first spring having a first axis to urge a seat back of the aircraft seat into an upright position, the first spring arranged to compress as the aircraft seat is manually reclined;
  a helper spring having a second axis parallel to the first axis, the helper spring arranged to assist or counteract the first spring;
  an adjustment mechanism including a motor, the adjustment mechanism coupled to the first spring to adjust the first spring to thereby adjust the helper spring to increase or decrease a force exerted by the helper spring to assist or counteract the first spring; and
  a weight sensing mechanism including a strain gauge, the weight sensing mechanism coupled to the adjustment mechanism and operable to actuate the adjustment mechanism in direct proportion to a weight of a seated passenger, whereby the force exerted on the aircraft seat to urge the seat back into the upright position is greater for a heavier seated passenger.

2. The tilt-recline force adjusting apparatus of claim 1, wherein the first spring is a gas spring comprising an outer cylinder and an inner cylinder.

3. The tilt-recline force adjusting apparatus of claim 2, wherein the adjustment mechanism comprises the motor and a gear mounted to a shaft of the motor, wherein the gear is configured to rotate the outer cylinder of the first spring to lengthen the first spring to compress the helper spring.

4. The tilt-recline force adjusting apparatus of claim 2, wherein
  the outer cylinder comprises an opening; and
  the adjustment mechanism comprises a chain having at least one lateral projection;
  wherein, upon actuation by the weight sensing mechanism, the adjustment mechanism moves the chain to align the lateral projection with the opening such that the lateral projection extends through the opening to limit compression of the first spring.

5. The tilt-recline force adjusting apparatus of claim 4, wherein the adjustment mechanism comprises:
  a rail; and
  a bracket configured to slide along the rail, wherein the chain is attached to the bracket.

6. The tilt-recline force adjusting apparatus of claim 1, wherein the weight sensing mechanism includes circuitry communicatively coupled to the strain gauge, the circuitry being configured to determine passenger weight based upon a plurality of signals supplied by the strain gauge, thereby reducing the effect of movement of the seated passenger.

7. The tilt-recline force adjusting assembly of claim 1, wherein the force exerted by the helper spring is directly proportional to the weight of the seated passenger within an established range as dictated by a size of the helper spring.

8. The tilt-recline force adjusting assembly of claim 1, wherein increasing or decreasing the force exerted by the helper spring comprises adjusting a length of the first spring.

9. A manually reclinable aircraft passenger seat comprising:
  a locking gas spring for urging a seat back of the aircraft passenger seat into an upright position;
  a weight sensing mechanism including a strain gauge for sensing a weight of a seated passenger; and
  a helper spring coaxially aligned with the locking spring, the helper spring for adjusting a force exerted by the locking gas spring in response to a weight sensed by the weight sensing mechanism whereby the force exerted on the seat back to urge the seat back into an upright position is greater for a heavier seated passenger.

10. The aircraft passenger seat of claim 9, wherein the seat back is reclined by the seated passenger by pushing rearwardly on the seat back.

11. The aircraft passenger seat of claim 9, wherein the helper spring alters the force exerted by the locking gas spring for passenger weights above 50 pounds.

* * * * *